(12) United States Patent
Floyd et al.

(10) Patent No.: US 8,104,158 B2
(45) Date of Patent: Jan. 31, 2012

(54) DETECTING AND REWORKING INCONSISTENCIES PROXIMATE AIRCRAFT SPLICE JOINTS

(75) Inventors: Joseph F. Floyd, University Place, WA (US); John R. Linn, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 12/484,611

(22) Filed: Jun. 15, 2009

(65) Prior Publication Data

US 2009/0288529 A1  Nov. 26, 2009

Related U.S. Application Data

(63) Continuation-in-part of application No. 10/928,543, filed on Aug. 26, 2004, now abandoned.

(51) Int. Cl.
*B23P 6/00* (2006.01)

(52) U.S. Cl. .................................................. 29/402.11
(58) Field of Classification Search ............. 29/402.11, 29/402.01–402.09, 407.01, 407.04; 324/240; 244/131; 83/13

See application file for complete search history.

(56) References Cited

U.S. PATENT DOCUMENTS

| | | | |
|---|---|---|---|
| 3,963,980 | A | 6/1976 | Shkarlet |
| 4,706,020 | A | 11/1987 | Viertl et al. |
| 5,760,904 | A | 6/1998 | Lorraine et al. |
| 6,405,978 | B1 | 6/2002 | Dean et al. |
| 6,681,466 | B2 | 1/2004 | David et al. |
| 2002/0166219 | A1 | 11/2002 | David et al. |
| 2003/0116331 | A1 | 6/2003 | Boyl-Davis et al. |
| 2005/0237055 | A1 | 10/2005 | Sun et al. |

*Primary Examiner* — John C Hong
(74) *Attorney, Agent, or Firm* — Yee & Associates, P.C.

(57) ABSTRACT

Detecting inconsistencies proximate a panel splice joint involves trimming a portion of a first panel overlapping a second panel to expose a previously overlapped region of the second panel. The previously overlapped region of the second panel may be inspected to detect any inconsistencies present thereon after trimming the portion.

35 Claims, 10 Drawing Sheets

DETECTING AND REWORKING INCONSISTENCIES PROXIMATE AIRCRAFT SPLICE JOINTS

This application is a continuation-in-part of application Ser. No. 10/928,543, filed Aug. 26, 2004, status allowed, which is herein incorporated by reference.

BACKGROUND

1. Field

The present disclosure relates generally to a technique of detecting inconsistencies located proximate aircraft skin joints, and more specifically to the detection and rework of inconsistencies in and about a panel adjacent a lap joint or other types of skin splices or joints.

2. Description of the Related Art

Skin panels may typically be comprised of a first skin portion and a second skin portion. The assembly of a skin portion with another skin portion may include, without limitation, a number of actions such as a fit up of the panels, sealant installation, fastener hold drilling, and fastener installation. Assembly type actions may also occur during maintenance. It must be noted that a number of these actions may include one or more individual, sequential, or concurrent occurrences. The skin panel joints may contain inconsistencies.

The rework of inconsistencies within or proximate to a lapped area of skin panels, in particular metal and or composite panels, may be a relatively costly and cumbersome process. The rework of inconsistencies may also be complicated because overlapping panels may prevent access to an area of interest.

Additionally, detecting and reworking inconsistencies in metal or composite panels may also be challenging. It may be difficult to detect inconsistencies in panel joints through detection methods such as, without limitation, visual detection. In some cases, detection of inconsistencies may possibly require, without limitation, the use of ultrasonic, sub-surface eddy current detection methods, and/or other such detection methods that may be considered costly and/or cumbersome.

Therefore, it would be advantageous to have a method that takes into account at least some of the issues described above, as well as possibly other issues.

SUMMARY

In an advantageous embodiment, a method provides for detecting inconsistencies proximate an aircraft panel splice joint formed where a first skin panel overlaps a second panel. A portion of the first skin panel overlapping the second panel is trimmed to expose a previously overlapped region of the second panel. The previously overlapped region is inspected to detect any inconsistencies after trimming the portion.

In an advantageous embodiment, a method provides for detecting inconsistencies proximate an aircraft splice joint formed where a first skin panel overlaps a second panel. A portion of the first skin panel overlapping the second panel is trimmed to expose a previously overlapped region of the second panel. The previously overlapped region is inspected to detect any inconsistencies that may exist after trimming the portion. Reworking of the detected inconsistencies may occur.

In an advantageous embodiment, a method of detecting inconsistencies provides for trimming a portion of a first skin panel overlapping the second panel to expose a previously overlapped region of the second panel while leaving the second panel unchanged. The trimming may be performed without removing a remaining portion of the first skin panel, and some of the remaining portion may remain after the trimming. Inspection of the previously overlapped region may take place after the step of trimming the overlapping portion of the first skin panel.

The features, functions, and advantages is achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
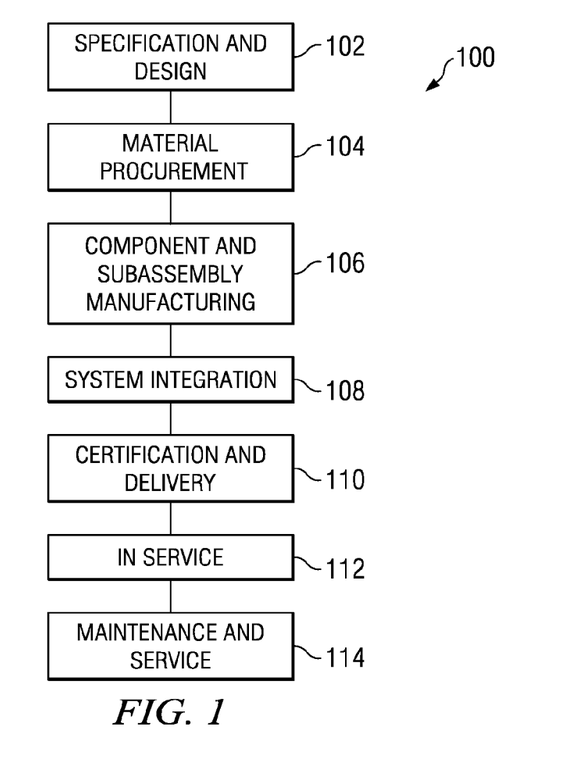
FIG. 1 is an illustration of a top level flowchart of aircraft manufacturing and service method in accordance with an advantageous embodiment of the disclosure.
Figure 2:
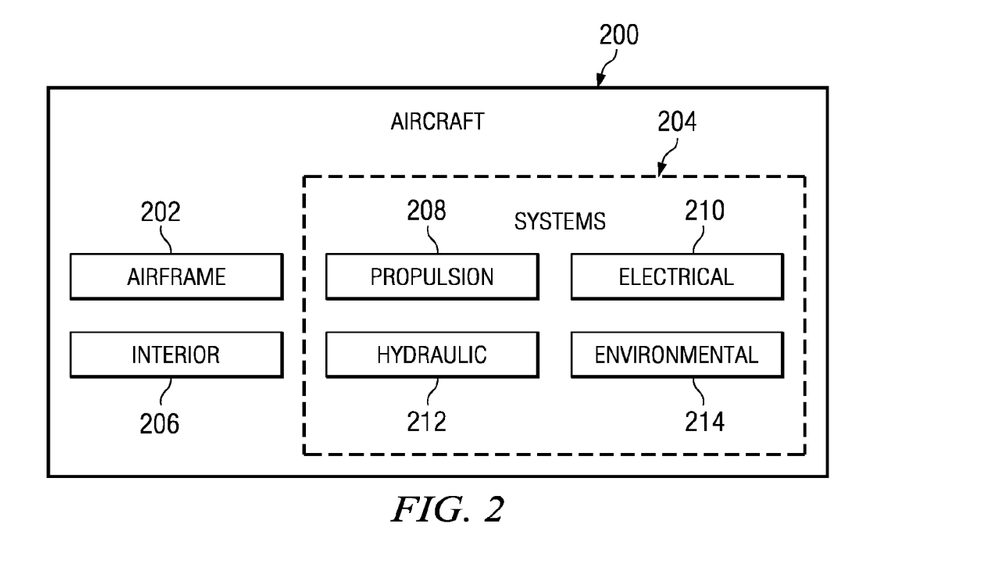
FIG. 2 is an illustration of an aircraft in accordance with an advantageous embodiment of the disclosure.

Referring more particularly to the drawings, embodiments of the disclosure may be described in the context of the aircraft manufacturing and service method 100 as illustrated in FIG. 1 and aircraft 200 as illustrated in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include rework, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. It must be recognized that although inconsistencies may be detected in any section of aircraft 200, the inconsistencies of interest in this disclosure may be detected more in the airframe 202 sections of the aircraft 200. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Figure 3:
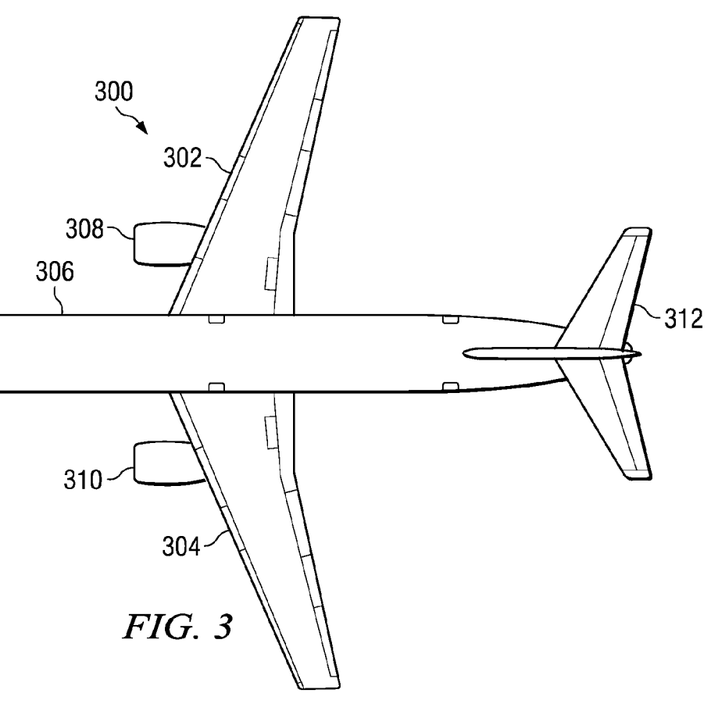
FIG. 3 is an illustration of a top level view of an aircraft in accordance with an advantageous embodiment of the disclosure.

With reference now to FIG. 3, an illustration of an aircraft is depicted in which an advantageous embodiment of detecting and reworking inconsistencies in metal and/or composite overlap joints may be implemented. Aircraft 300 is an example of one implementation of aircraft 200 in FIG. 2. In this illustrative example, aircraft 300 has wings 302 and 304 attached to fuselage 306. Aircraft 300 may also includes wing mounted engine 308, wing mounted engine 310, and tail 312. Fuselage 306 may comprise a number of skin overlap joints. For example, a skin overlap joint may be created when two or more aircraft skin panels are joined together, as in a full overlap joint, a splice joint where an inner and/or another splice plate overlaps adjacent panels to form the joint. Fuselage 306 of aircraft 300 may include a number of joints, such as without limitation, lap joints and/or splice joints. It must be noted that a number may be any integer value greater than zero.

Figure 4:
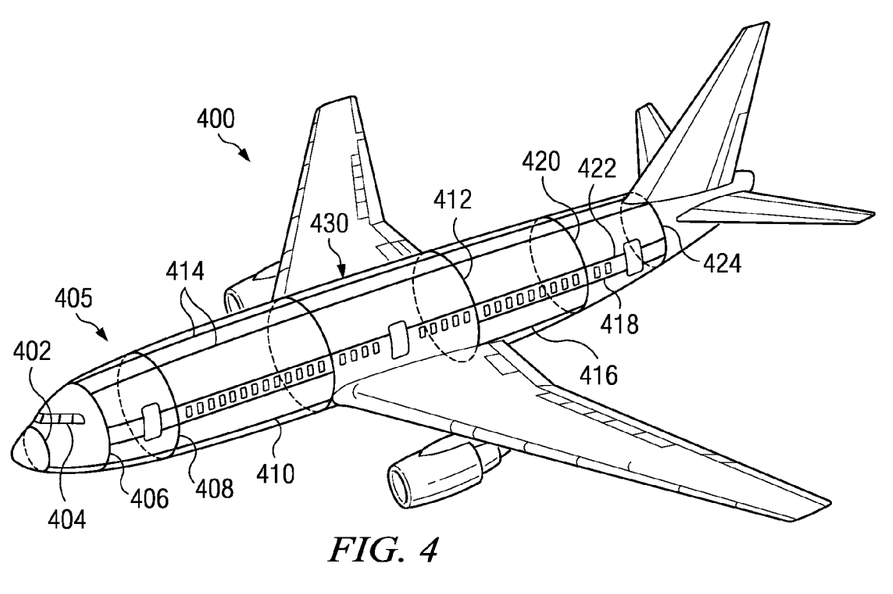
FIG. 4 is an illustration of a three dimensional side view of an aircraft in accordance with an advantageous embodiment of the disclosure.

With reference now to FIG. 4, aircraft 400 may represent a side perspective of aircraft 300 depicted in FIG. 3. Aircraft 400 illustrates a number of areas where skin overlap joints may be formed on an aircraft fuselage. The number and location of skin overlap joints depicted in FIG. 4 is merely exemplary. The illustration of these joints may not in any way, numerically or physically, be limited to the illustration in this figure.

In this illustrative example, fuselage 430 may be apportioned into a number of sections. Each section may include a number of points at which lap joints and/or other types of splices may be formed. For example, lap joints and/or other types of splices may be formed in the nose 402 of fuselage 430 at 402, 404, and 406. Within front section 405 of fuselage 430, lap joints and/or other types of splices may form at locations, such as locations 408 and 410. Within the center area of the fuselage 430, lap joints and/or other types of splices may be formed at locations 412, 414, 416 and 418. Splice joints may also be formed in the tail portion of the fuselage at locations 420, 422, and 424.

The different advantageous embodiments take into account and recognize that it may be desirable to have a method for detecting inconsistencies in metal and/or composite lap joints and/or other types of splice joints. Accordingly, the different advantageous embodiments provide a method for detecting inconsistencies.

In accordance with one advantageous embodiment, a portion of a first skin panel overlapping a second panel may be trimmed to expose a previously overlapped region of the second panel, while leaving the second panel unchanged. A remaining portion of the first skin panel may remain after the trimming. The previously overlapped region may be inspected to detect any inconsistencies after trimming the portion.

In accordance with another advantageous embodiment, a skin panel may be butt joined with an adjacent panel with at least one splice plate splicing the panels together. An overlap area between the splice plate and the skin panel may be inspected to detect any inconsistencies.

Figure 5:
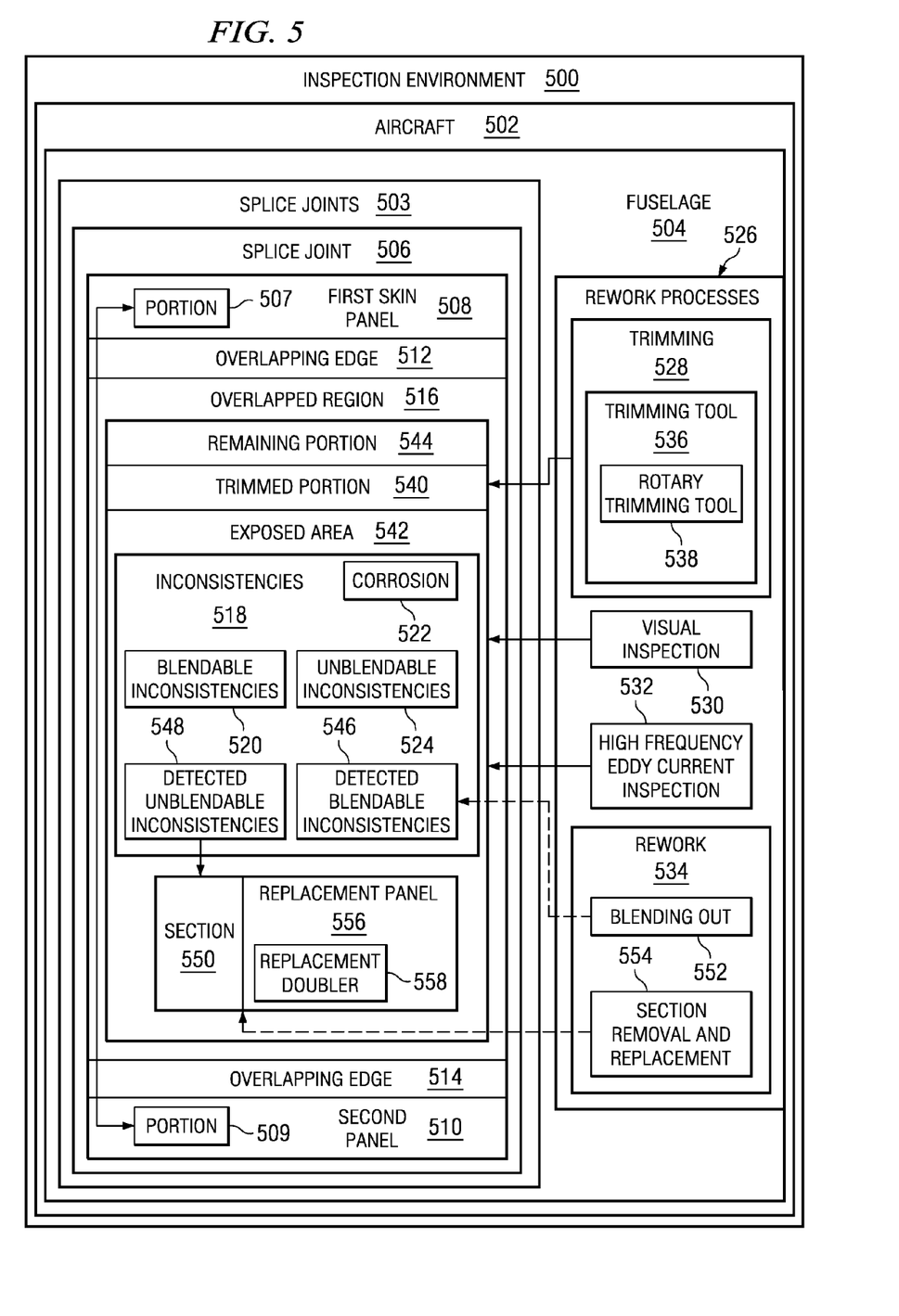
FIG. 5 is an illustration of a top level block in accordance with an advantageous embodiment of the disclosure.

With reference now to FIG. 5, an illustration of inspection environment 500 is depicted in accordance with an advantageous embodiment. In this illustrative example, inspection environment 500 may be used to inspect aircraft 502. More specifically, inspection environment 500 may be used to inspect splice joints 503 in fuselage 504 of aircraft 500, such as splice joint 506. An overlap joint may be a splice joint with an overlapping structure. The overlap may be, without limitation, a lap, a double, or other such structure known to one skilled in the art. Fuselage 504 of aircraft 502 may be one example of one implementation for fuselage 306 of aircraft 300 in FIG. 3.

In these illustrative examples, fuselage 504 of aircraft 502 may be formed by joining panels, such as, for example, without limitation, first skin panel 508 and second skin panel 510. First skin panel 508 and second skin panel 510 may be, without limitation, a metal and/or a composite as would be recognized by one skilled in the art. For example, without limitation, splice joint 506 may be formed by the overlapping of portion 507 of first skin panel 508 and portion 509 of second panel 510. The portion of first skin panel 508 that overlaps may be at overlapping edge 512. The portion of second panel 510 that overlaps may be at overlapping edge 514. These portions may overlap to form overlapped region 516 of splice joint 506. It must be noted that the formation of splices within overlapped areas are of particular focus, particularly, without limitation, lap splices, splices with splice plates and/or doublers, and other such splice formations that may be recognized by one skilled in the art.

Splice joint 506 may have a number of inconsistencies 518 that may require detection and/or rework in metal. Inconsistencies 518 may include, for example, without limitation, at least one of a number of out of tolerance blendable inconsistencies 520, corrosion 522, unblendable inconsistencies 524, and/or other out of tolerance inconsistencies. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. Also, as used herein, "a number of" items may refer to one or more items. For example, a number of inconsistencies may mean one inconsistency or more than one inconsistency. In these illustrative examples, an operator may inspect splice joint 506 in overlapped region 516 to detect inconsistencies 518. The operator may perform detection and rework processes 526 to detect and rework any inconsistencies 518 found in splice joint 506. Detection and rework processes 526 may include, for example, without limitation, trimming 528, visual inspection 530, high frequency eddy current inspection 532, reworking 534, and/or other suitable processes for detecting, inspecting, and/or reworking inconsistencies 518.

Trimming 528 may be performed on overlapped region 516 to remove a portion of first skin panel 508 from overlapped region 516 and expose the previously overlapped portion of second panel 510. The operator may use a trimming tool such as, for example, without limitation, trimming tool 536, to cut and trim the portion of first skin panel 508 overlapping second panel 510. Trimming tool 536 may be any tool such as, for example, without limitation, rotary trimming tool 538, capable of cutting and trimming a metal and/or composite material. Further, trimming tool 536 may be a tool that does not undesirably change splice joint 506 when cutting and trimming are performed.

The portion of first skin panel 508 trimmed by trimming tool 536 may be trimmed portion 540. The use of trimming tool 536 may leave exposed area 542. Exposed area 542 may be the portion of second panel 510 left exposed after trimmed portion 540 is trimmed. Further, exposed area 542 may be an unchanged portion of second panel 510. In these illustrative examples, an unchanged portion may be a trimmed portion 540 of overlapped region 516 that is without out of tolerance inconsistencies, untouched, or unmarked, as would be recognized by one skilled in the art. For example, without limitation, an unchanged portion of second panel 510 may be a portion not trimmed and/or cut by trimming tool 536.

Removal of trimmed portion 540 of first skin panel 508 from overlapped region 516 may leave behind remaining portion 544 of first skin panel 508. In some advantageous embodiments, remaining portion 544 of first skin panel 508 may be manually removed to further expose exposed area 542.

In these illustrative examples, an operator may perform inspection of exposed area 542. This inspection may be performed by visual inspection 530 and/or some other suitable form of inspection. The operator may perform visual inspection 530 on exposed area 542 to inspect splice joint 506 for inconsistencies 518 in metal panels. More specifically, in these illustrative examples, the operator may perform visual inspection 530 to inspect for blendable inconsistencies 520, corrosion 522, unblendable inconsistencies 524, and/or other inconsistencies that may be visible to the operator. For example, without limitation, visual inspection 530 may reveal detected blendable inconsistencies 546 on exposed second panel 542.

Blendable inconsistencies 520 may be, for example, without limitation, scratches of a sufficiently superficial depth that they may be reworked by blending. Unblendable inconsistencies 524 may be, for example, without limitation, deep scratches, cracks, or other such inconsistencies.

Following visual inspection 530 of exposed area 542, the operator may test exposed area 542 to reveal inconsistencies 518 in metal panels in the form of unblendable inconsistencies 524 in splice joint 506. The testing may be performed by high frequency eddy current inspection 532. In these illustrative examples, performing high frequency eddy current inspection 532 on exposed second panel 542 may reveal detected unblendable inconsistencies 548 in section 550 of exposed second panel 542.

In these illustrative examples, an operator may rework inconsistencies 518 found in splice joint 506 by performing rework 534. Rework 534 may include, for example, without limitation, blending out 552 in metal panels, doubler addition, patch addition, section removal and replacement 554, resin rejection and/or other suitable rework processes. The doubler and/or patch may be attached with adhesive and/or fasteners. Underlying structure may or may not be removed depending upon the particulars of the rework. In these examples, blending out 552 may be performed to blend out detected blendable inconsistencies 546 that may be found on exposed area 542.

In an embodiment, rework may include a determination of whether a detected inconsistency is out of tolerance prior to performing any processes. For example, an inconsistency may be reworked only when it is outside a particular width, length, depth or other dimensional tolerance. In another embodiment, all inconsistencies may be reworked.

In these examples, doubler addition, section removal and/or replacement 554 may be performed to rework inconsistencies, such as detected unblendable inconsistencies 548 found in splice joint 506. Using this process, section 550 of exposed second panel 542 with detected unblendable inconsistencies 548 may be removed. This section of exposed second panel 542 may be replaced by replacement panel 556. In these illustrative examples, replacement panel 556 may be, for example, without limitation, replacement doubler 558. In some cases, it may be possible to add one or more replacement doublers, such as replacement doubler 558, without removing panels or structures that include detected blendable inconsistencies 546 and detected unblendable inconsistencies 548.

The illustration of inspection environment 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, trimming 528 may be performed by a trimming tool other than rotary trimming tool 538. In other advantageous embodiments, a process for detecting unblendable inconsistencies 524 other than high frequency eddy current inspection 532 may be performed. In yet other advantageous embodiments, rework 534 may include a rework process for reworking corrosion 522 that may be detected in splice joint 506.

Figure 6:
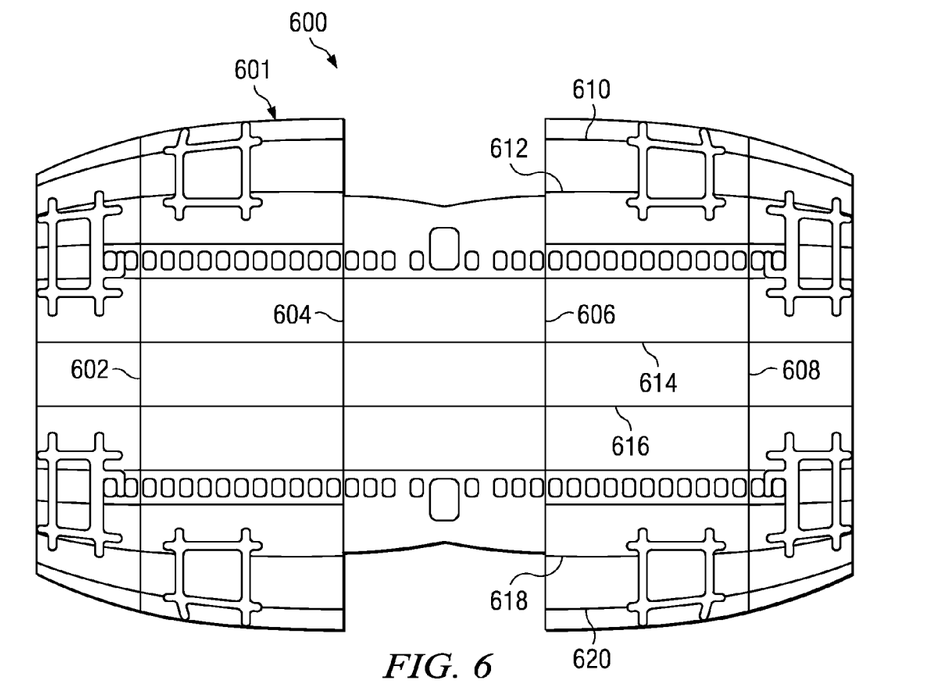
FIG. 6 is an illustration of a plan view of an aircraft fuselage in accordance with an advantageous embodiment of the disclosure.

Turning now to FIG. 6, an illustration of a plan view of aircraft fuselage is illustrated in accordance with an advantageous embodiment of the disclosure. Aircraft fuselage 600 is an example of one implementation of fuselage 504 in FIG. 5. Aircraft fuselage 600 may comprise a number of skin panels, shown and detailed later in this disclosure, that are assembled together to form structural panel 601. It must be noted that in this illustrative embodiment, the size, type and number of structural panels is in no way limited to structural panel 601.

For example, a first skin panel, illustrated later in this disclosure or portion may be assembled or spliced together with a second skin panel, also illustrated later in this disclosure, or portion to form a joint, such as, without limitation, overlap joint 610. It may be that any overlapped area of metal and/or composite of fuselage 600 may include, without limitation, a splice joint such as a butt joint and/or a lap joint. An overlap joint may include, for example, without limitation, a longitudinal joint, a circumferential joint, and/or other suitable types of joints. An overlap joint may be formed by a number of attachment techniques that may include, but without limitation, a sealant, adhesive welding, a number of fasteners, a number of rows of rivets disposed proximate an overlapping edge, or a combination of techniques known to one skilled in the art.

Aircraft fuselage 600 may include a number of circumferential overlap joints, such as, circumferential overlap joints 602, 604, 606, and 608. Aircraft fuselage 600 may also have a number of longitudinal overlap joints, such as, longitudinal overlap joint 610, 612, 614, 616, 618, and 620. It must be understood that the number and type of overlap joints illustrated in aircraft fuselage 600 is exemplary only and may vary depending on a selected implementation and application.

Figure 7:
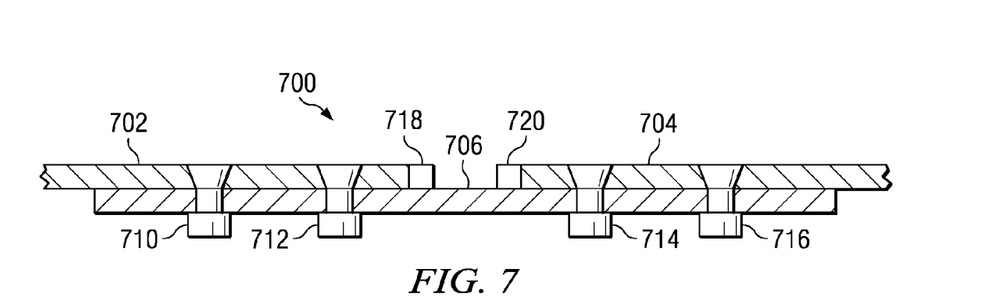
FIG. 7 is an illustration of a cross-sectional view of a circumferential overlap joint in accordance with an advantageous embodiment.

Referring now to FIG. 7, an illustration of a circumferential splice joint, particularly a butt joint, is depicted in accordance with an advantageous embodiment of the disclosure. Circumferential butt joint 700 may be formed by coupling a first skin panel 702, and a second first skin panel 704 to a second structural skin panel 706. The first skin panels 702 and 704 may be coupled together by a number of fasteners, such as, without limitation, rivets 710, 712, 714 and 716.

Figure 8:
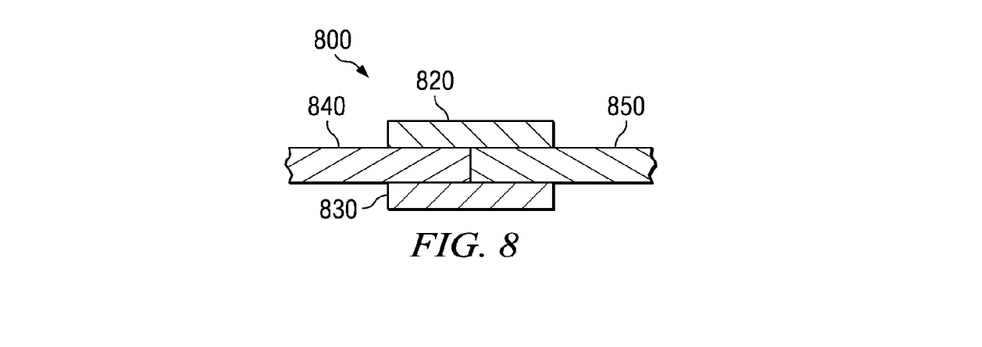
FIG. 8 is an illustration of a cross-sectional view of a butt overlap joint in accordance with an advantageous embodiment.

Referring now to FIG. 8, an illustration of a cross sectional view of a butt joint with an inner and outer splice doubler is depicted in accordance with an advantageous embodiment of the disclosure. Butt joint 800 may comprise a number of panels that are jointed with a same planar surface. For example, panel 840 and panel 850 illustrate the formation of an end-to-end square butt joint. In FIG. 8, splice doubler 820 and panels 840 and 850 form first overlap joint. Similarly splice doubler 830 and panel 840 and 850 form a second overlap joint. Butt joint 800 may also be considered to be a double strap or a double splice butt joint.

Figure 9:
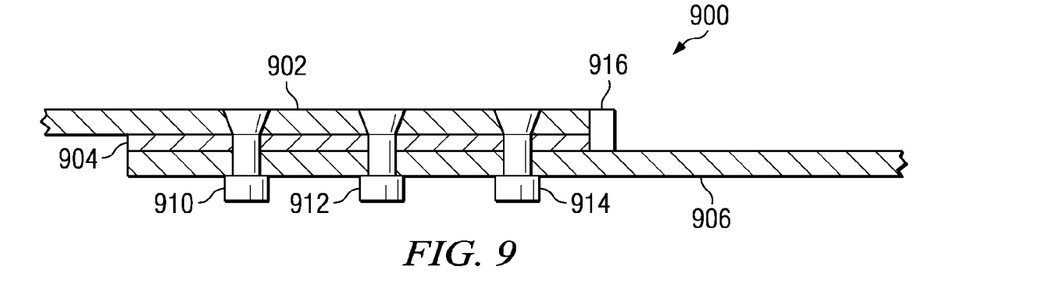
FIG. 9 is an illustration of a cross-sectional view of a longitudinal overlap joint in accordance with an advantageous embodiment.

Referring now to FIG. 9, an illustration of a cross section of a lap joint, and in particular a longitudinal overlap joint, is depicted in accordance with an advantageous embodiment of the disclosure. In this illustrative example, longitudinal overlap joint 900 may comprise a number of layers, such as a first skin panel 902, a doubler 904, and a second skin panel 906.

In an advantageous embodiment, first skin panel 902, doubler 904, and second skin panel 906 may be manufactured from a light-weight alloy, such as, for example, without limitation, titanium, aluminum and other such alloys recognized by one skilled in the art. The alloy may have a base metal component that further comprises an alloy, such as, for example, without limitation, an aluminum-copper alloy. First skin panel 902 may be sealed to doubler 904 by a sealant. Doubler 904 may be also sealed to second skin panel 906 by a sealant. Fasteners, such as without limitation, a number of rows of countersunk rivets, such as 910, 912 and 914, may also be used alone or in combination with a sealant to couple the layers. The number and type of rivets illustrated are exemplary and may be varied depending on application and configuration.

Figure 10:
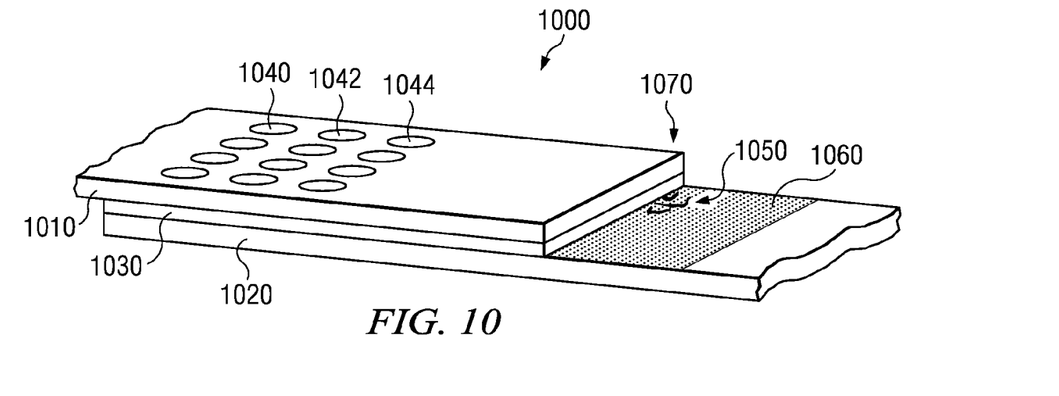
FIG. 10 is an illustration of an isometric view of an untrimmed longitudinal overlap joint of the type depicted in FIG. 9 in accordance with an advantageous embodiment.

With reference now to FIG. 10, an illustration of an isometric view of the longitudinal overlap joint in FIG. 9 is depicted in accordance with an advantageous embodiment. In these illustrative examples, longitudinal overlap joint 1000 may comprise first skin panel 1010, second skin panel 1020 and doubler 1030 sealed to first skin panel 1010 and second skin panel 1020. Longitudinal overlap joint 1000 may also include a number of rivets, such as 1040, 1042, and 1044. Longitudinal overlap joint 1000 may include an inconsistency 1050 on a portion of the surface area 1060 of second skin panel 1020. A portion may be completely exposed or may only be partially exposed and extend to an overlapping area 1070 of longitudinal overlap joint 1000. The overlapping area 1070 may be the area between second skin panel 1020 and first skin panel 1010.

In an embodiment, inconsistency 1050 may be a scratch or a series of blendable inconsistencies. It must be noted that inconsistencies in metal is in no way limited to blendable inconsistencies, but may also include unblendable inconsistencies, added artifacts or fragments, commonly referred to as foreign object debris space (FOD), blendable inconsistencies, or other such metal inconsistencies that may be recognized by one skilled in the art.

Referring again to FIG. 10, in accordance with an advantageous embodiment, an area 1060 of the first skin panel 1020 is disposed proximate to the overlapping edge of longitudinal overlap joint 1000. Area 1060 may correspond to the location of excess sealant that may have been removed during maintenance. The removal of the excess sealant by a tool may have resulted in the formation of inconsistency 1050. In an embodiment, it may be that the overlapping edge 1070 of the longitudinal overlap joint 1000 configuration comprising second skin panel 1020, doubler 1030, and first skin panel 1010 may conceal the full extent of inconsistency 1050 or additional inconsistencies that may exist on the surface of area 1060.

Figure 11:
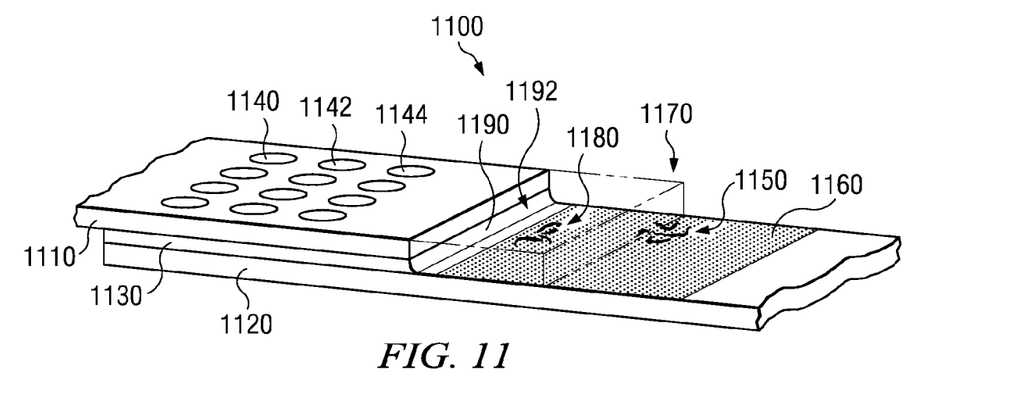
FIG. 11 is an illustration of a top level diagram of the trimming of a longitudinal overlap joint of the type depicted in FIG. 9 in accordance with an advantageous embodiment.

Turning now to FIG. 11, an illustration of a second isometric view of the longitudinal overlap joint in FIG. 9 is depicted in accordance with an advantageous embodiment. In these illustrative examples, longitudinal overlap joint 1100 illustrates first skin panel 1110, second skin panel 1120 and bonded doubler 1130. Longitudinal overlap joint 1100 also include a number of rivets, such as 1140, 1142, and 1144 sealed to a first skin panel 1110 and second skin panel 1120. It is contemplated that an adhesive may be used instead of or in addition to rivets and/or other types of fasteners. It must be noted that in some embodiments, first skin panel 1110 may be attached to second skin panel 1120 without a doubler, such as bonded doubler 1130.

In FIG. 11, inconsistency 1150 may be created on area 1160 of second panel 1120. The overlapping edge 1170 of longitudinal overlap joint 1100 may be trimmed and may reveal additional inconsistencies, such as inconsistency 1180. Overlapping edge 1170 may be trimmed or partially removed without an undesirable change to the longitudinal overlap joint 1100. The trimming may substantially reveal surface area 1160 to permit a visual or other inspection of the surface area 1160.

Figure 12:
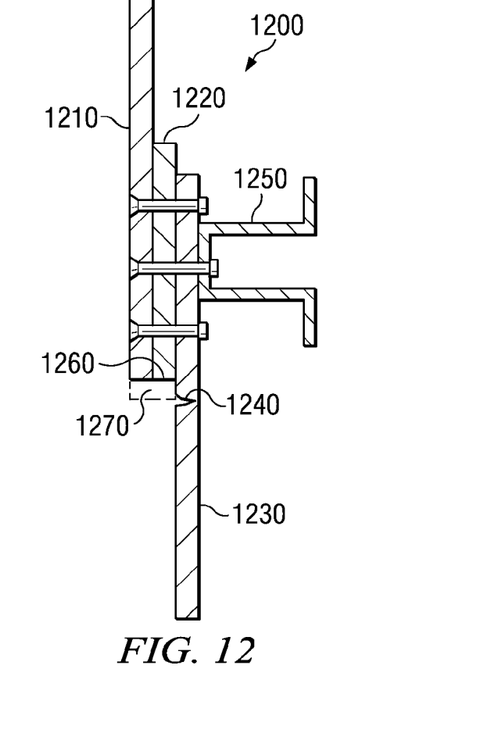
FIG. 12 is an illustration of a magnified photographic cross-sectional view of the untrimmed overlap joint illustrated in FIG. 10 in accordance with an advantageous embodiment.

With reference now to FIG. 12, an illustration of a detailed view of the trimming of a longitudinal overlap joint 1200 of an aircraft is depicted in accordance with an advantageous embodiment. In this illustrative example, the longitudinal overlap joint 1200 of an aircraft may include first skin panel 1210, second skin panel 1230, and bonded doubler 1220. Stringer 1250 may be a part of overlap joint 1200 in some cases. Longitudinal overlap joint 1200 may include an inconsistency such as inconsistency 1240. Inconsistency 1240 may be a blendable inconsistency, unblendable inconsistency, or other inconsistency as may be recognized by one skilled in the art. Inconsistency 1240 may be slightly concealed by an overlapping edge 1260. An area 1270 of overlapping edge 1260 may be trimmed to completely reveal inconsistency 1240.

Figure 13:
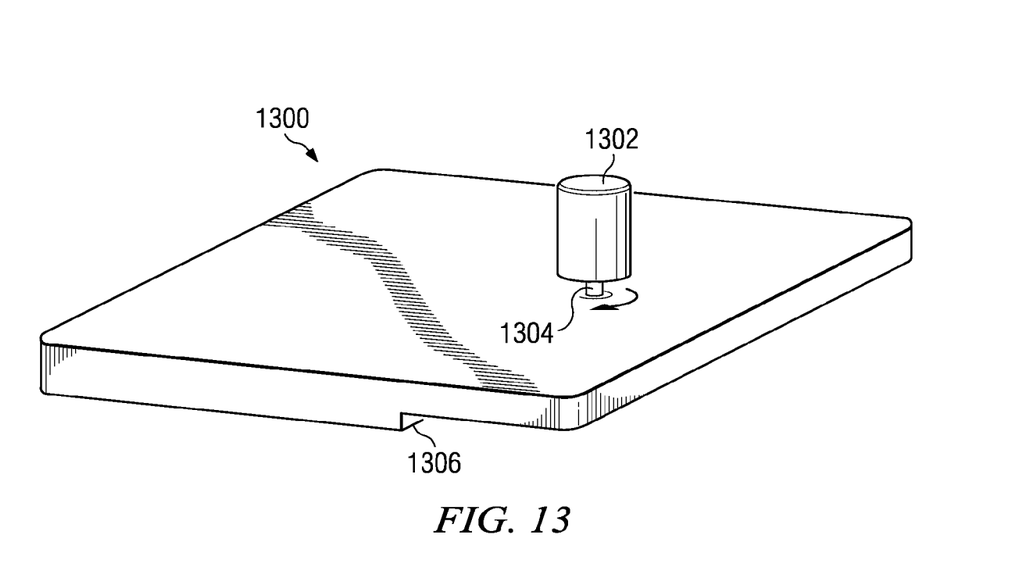
FIG. 13 is an illustration of a side view of a trim tool in accordance with an advantageous embodiment of the disclosure.

With reference now to FIG. 13, an illustration of a trim tool that may be used to trim an overlapping edge is depicted in accordance with an advantageous embodiment. In this illustrative example, trim tool 1300 may be used to trim an overlapping edge such as, for example, without limitation, overlapping edge 1260 in FIG. 12. Trim tool 1300 may comprise a handle 1302, a rotary cutting shaft 1304, and a guide edge 1306. Handle 1302 may be rotated in a clockwise and counterclockwise direction to adjust the length of rotary cutting shaft 1304. Adjusting rotary cutting shaft 1304 may lengthen or shorten a distal cutting edge (not shown), illustrated later in the disclosure.

Figure 14:
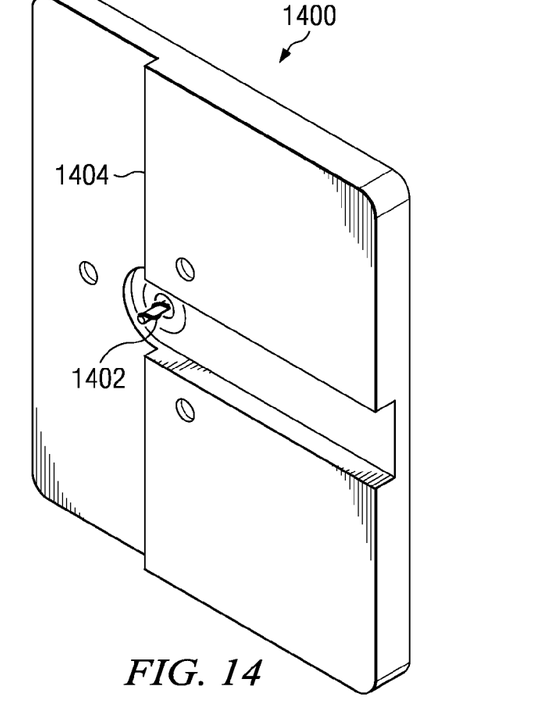
FIG. 14 is an illustration of a bottom view of the trim tool illustrated in FIG. 13 in accordance with an advantageous embodiment of the disclosure.

With reference now to FIG. 14, an illustration of a bottom view of a trim tool is depicted in accordance with an advantageous embodiment. In this illustrative example, trim tool 1400 may include distal cutting edge 1402 that may be controlled by a rotary cutting shaft (not shown). Trim tool 1400 may also include a guide edge 1404 to position the trim tool precisely next to an overlap joint that is to be trimmed.

Figures 15, 16:
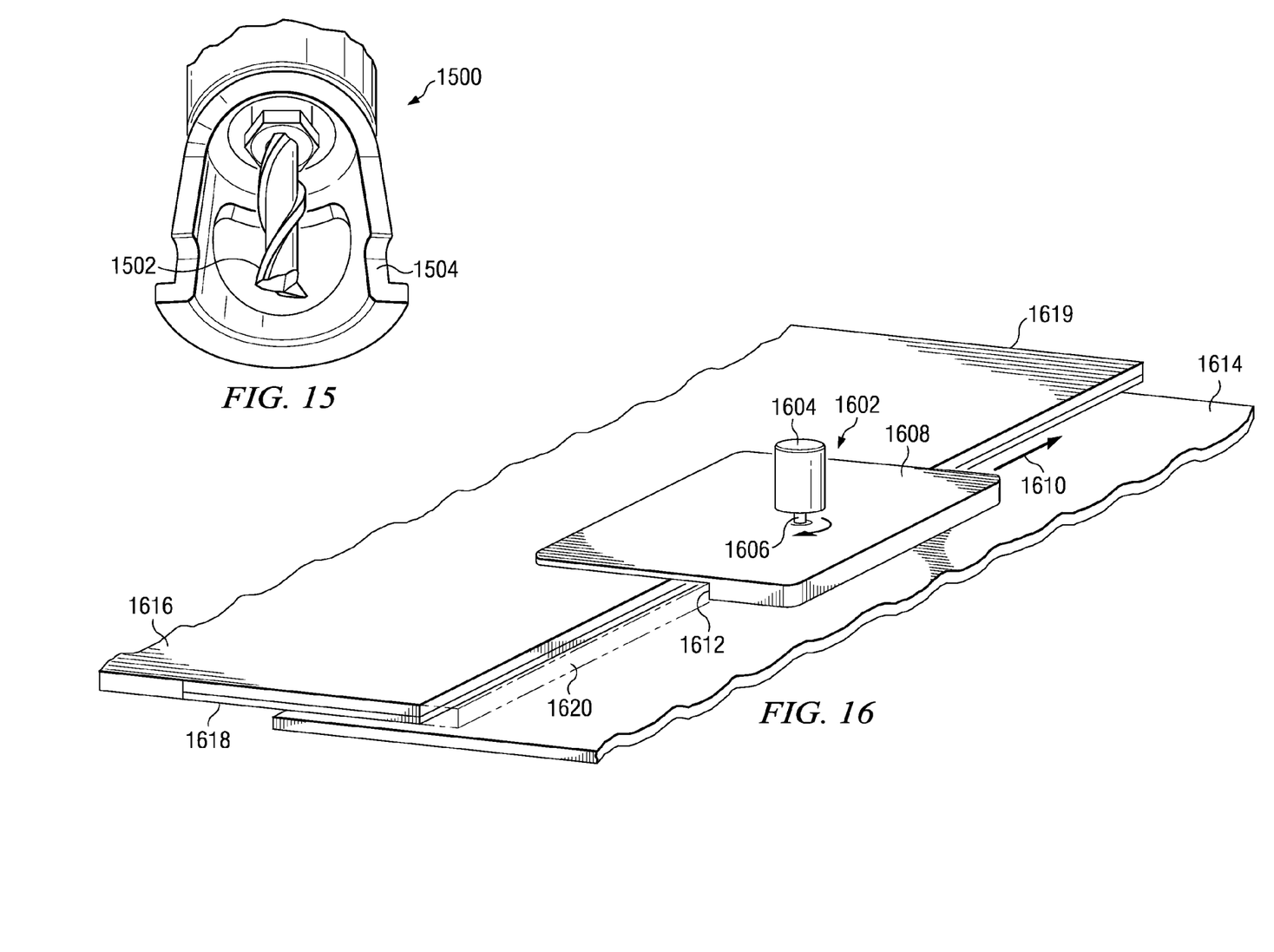
FIG. 15 is an illustration of a magnified view of the trim tool cutting edge illustrated in FIG. 14 in accordance with an advantageous embodiment of the disclosure.
FIG. 16 is an illustration of an isometric view of a overlap joint of the type depicted in tool cutting edge illustrated in FIG. 9 and a trimming tool for use thereon in accordance with an advantageous embodiment of the disclosure.

Referring now to FIG. 15 an illustration of a detailed view of a trim tool 1500 is depicted in accordance with an advantageous embodiment. In this illustrative example, trim tool 1500 may include distal cutting edge 1502 that is tapered in configuration and a guide edge 1504. The depth of distal cutting edge 1602 relative to guide edge 1504 may be adjusted to control the depth of the trimming. Trim tool 1500 may be of the type capable of trimming 0.070 inch plus or minus 0.010 inch.

With reference now to FIG. 16, an illustration of the operation of a trim tool 1602 is depicted in accordance with an advantageous embodiment. In these illustrative examples, a longitudinal overlap joint 1600 may comprise second skin panel 1614, first skin panel 1616, doubler 1618, and edge of overlap 1620. In operation, trim tool 1602 may be moved along longitudinal overlap joint 1600 through guide edge 1612 in the direction of arrow 1610 to trim edge of overlap 1620 away from first skin panel 1616 and doubler 1618.

The cutting shaft 1606 of trim tool 1602 may be offset from guide edge 1612 and second skin panel 1614 to enable the trimming of longitudinal overlap joint 1600 to a predetermined depth. The trimming depth may be controlled by adjusting the depth of the distal cutting edge (not shown) relative to guide edge 1612 through rotating the handle 1604 of rotary cutting shaft 1606. Trim tool 1602 may remove most or all of edge of overlap 1620 while leaving second skin panel 1614 unchanged. The surface area of second panel 1614 that is exposed by trimming may be further examined for additional inconsistencies.

In an embodiment, trim tool 1602 may be configured to leave behind a thin layer of doubler 1618 and sealant, if included, which may later be removed manually, such as a manual scraper. For example, trim tool 1702 may be configured to trim a width of more than 0.070 inches of overlapping edge 1620 along the full length of a longitudinal overlap joint 1600 within a width tolerance of ±0.010 inches or less than a width of 0.070 inches of overlapping edge 1620 of longitudinal overlap joint 1600 within a width tolerance of ±0.010 inches. In some embodiments, a thin layer of doubler 1618 and sealant may remain.

In an embodiment, trimming of an overlapping edge 1619 of an overlap joint, such as edge of overlap 1620 of longitudinal overlap joint 1600 may be performed by an automated or computer controlled trim tool machine instead of by a hand operated tool. The computer controlled trim tool machine may use a laser for trim feedback control of the overlap joint edge location and thickness.

The tapered cutting edge of trim tool 1602 may result in residual material remaining after trimming. For example, referring back to FIG. 11, residual material 1190 may remain after trimming. The residual material 1190 may be disposed along the base of edge 1192 proximate second panel 1120, and may include a remnant foil of doubler 1130, and first skin panel 1110. Residual material 1190 may be required to be of a relatively small width of about 0.020 inch, inclusive, and small thickness of about 0.003 inch, inclusive.

Figures 17, 18, 19:
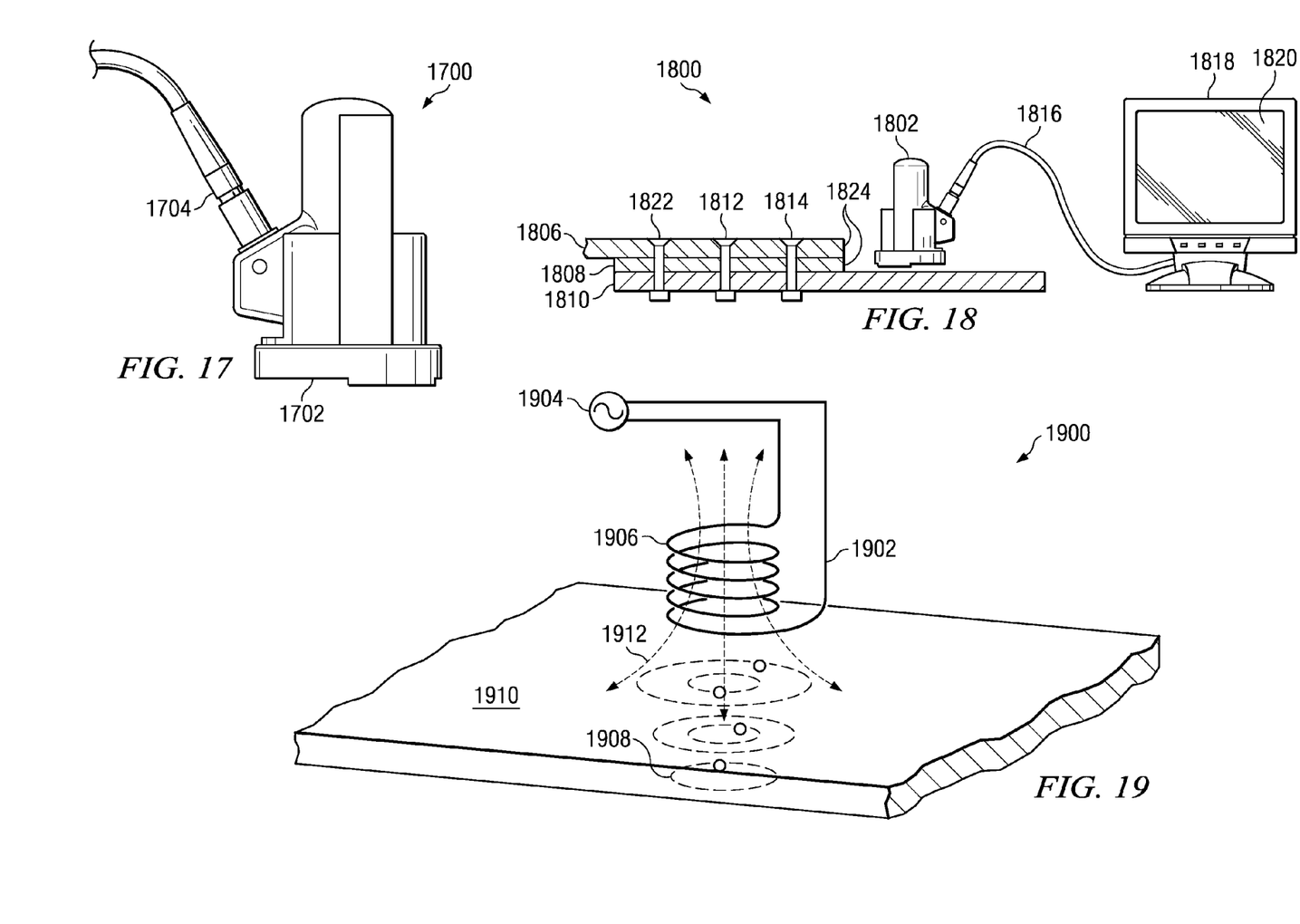
FIG. 17 is an illustration of a high frequency eddy current device in accordance with an advantageous embodiment of the disclosure.
FIG. 18 is an illustration of a side view a overlap joint of the type depicted in FIG. 9 and an isometric view of a high frequency eddy current device and detection instrument in accordance with an advantageous embodiment of the disclosure.
FIG. 19 is an illustration of a schematic view illustrating the generation of eddy currents in a test article through a high frequency eddy current device of the type shown in FIG. 17 in accordance with an advantageous embodiment.

Turning now to FIG. 17, an illustration of an exemplary high frequency eddy current device 1700 is depicted in accordance with an advantageous embodiment. In this illustrative example, high frequency eddy current device 1700 comprises a probe 1702 and may be coupled by a connection 1704 to an inspection instrument. High frequency eddy current inspection devices may be used to detect the presence of inconsistencies, and in particular, unblendable inconsistencies in metal panels, such as longitudinal overlap joint 1600 in FIG. 16 without destruction. In operation, the eddy current probe 1702 of high frequency eddy current device 1700 may be placed proximate to the edge of a trimmed overlap joint to enable the detection of inconsistencies, such as unblendable inconsistencies. High frequency eddy current inspection devices may be used alone or in conjunction with other non-destructive inspection (NDI) methods.

Turning now to FIG. 18, an illustration of an operational high frequency eddy current device setup 1800 is depicted in accordance with an advantageous embodiment. In this illustrative example, FIG. 18 includes high frequency eddy current device 1802 coupled by a connection 1816 to an inspection instrument 1818 having a display 1820. As illustrated in FIG. 18, high frequency eddy current device 1802 may create eddy currents (not shown) within an article. In an embodiment, the article may be an overlap joint 1804 including a second skin panel 1810, first skin panel 1806 and doubler 1808. The first skin panel 1806 and the second skin panel 1810 may be attached by rivets, such as rivets 1822, 1812, and 1814, and a sealant 1824, or some other fastening agent known to one skilled in the art. The strength of the eddy currents may be measured by high frequency eddy current device 1802 and the results of the measurements may be displayed on display 1820.

Turning now to FIG. 19, an illustration of an operational view 1900 of high frequency eddy current device 1902 is depicted in accordance with an advantageous embodiment. In this illustrative example, high frequency eddy current device 1902 creates eddy currents 1908 within an article 1910, such as a second or first skin panel, by delivering an alternating current 1904 via a conductive coil 1906. Alternating current 1904 may induce an alternating magnetic field 1912 which may induce the flow of eddy currents 1908. The strength of the eddy currents may be measured and the results displayed.

Figure 20:
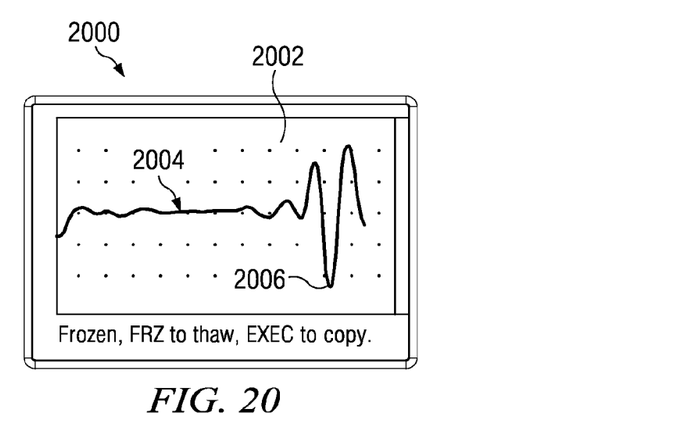
FIG. 20 is an illustration of a schematic view of an instrument that displays the measurement waveforms of a high frequency eddy current device of the type shown in FIG. 17 in accordance with an advantageous embodiment.

Referring now to FIG. 20, an illustration of measurement results of a high frequency eddy current device (not shown) is depicted in accordance with an advantageous embodiment. In this illustrative embodiment, inspection instrument 2000 shows the measurement results of a high frequency eddy current device (not shown) on display 2002. Waveform 2004 represents an eddy current measurement reading. In an embodiment, waveform 2004 provides an indication of an unblendable inconsistency 2006 that may register at a depth of around 0.007 inches. Waveform 2004 may indicate the presence of an unblendable inconsistency detected by a high frequency eddy current device.

Figure 21:
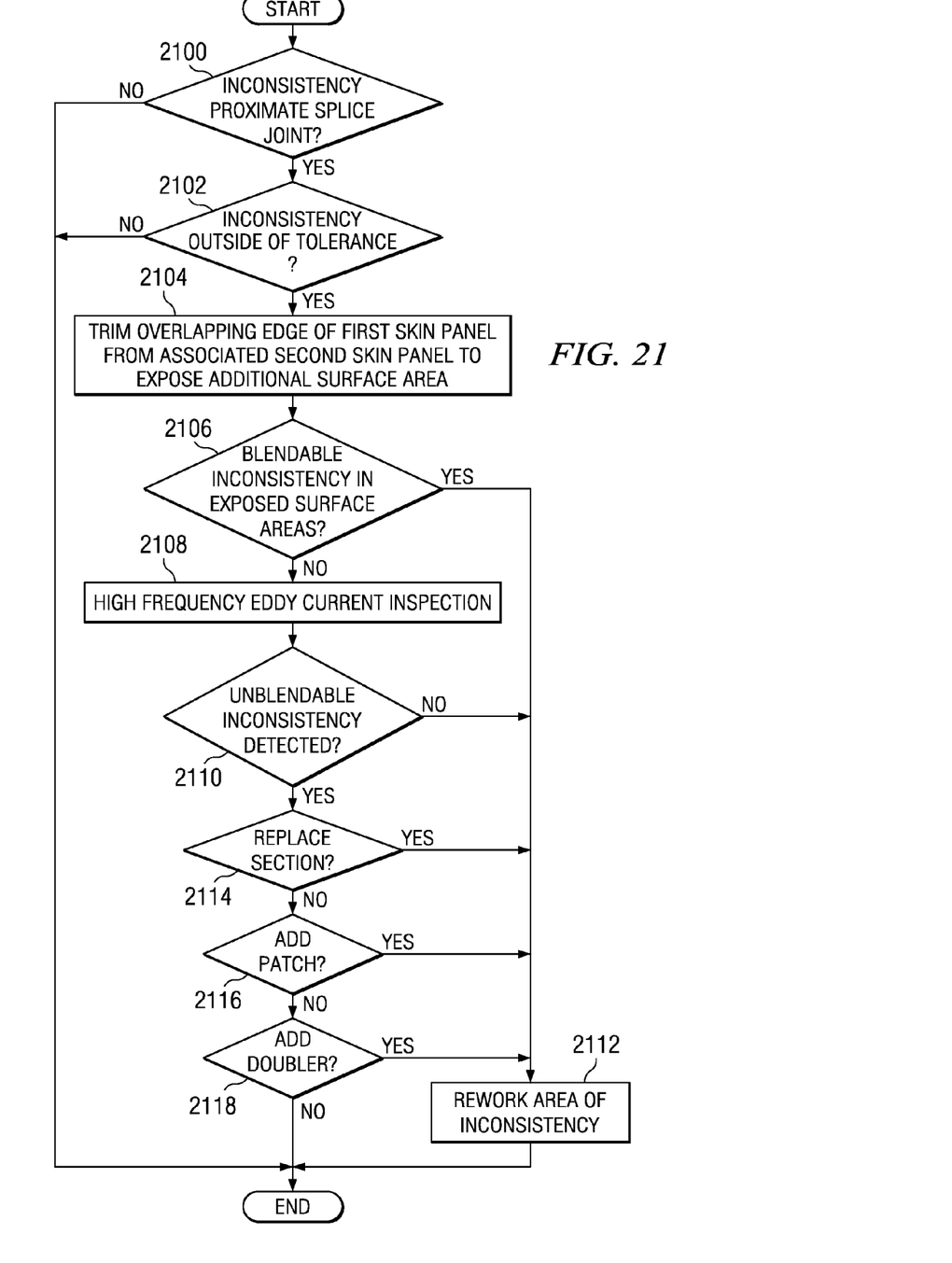
FIG. 21 is an illustration of a flow chart of the exemplary inventive method of detection and rework of inconsistencies according to an advantageous embodiment of the current disclosure.

With reference now to FIG. 21, an illustration of a flowchart of a process for detecting and reworking inconsistencies is depicted in accordance with an advantageous embodiment. In this illustrative embodiment, the process may be implemented in inspection environment 500 in FIG. 5. The process may be integrated into a maintenance and/or design process or may be part of a regularly scheduled inspection process.

The process may begin by examining the exposed surface area of a second skin panel proximate a splice joint for inconsistencies (operation 2100). The existence of an inconsistency may be determined by visual inspection or some other inspection method. If an inconsistency is not detected, the process may terminate.

In some cases, an inconsistency may be detected and checked to determine whether the detected inconsistency is outside a tolerance (operation 2102). The process may terminate if a detected inconsistency is not outside a tolerance. A detected inconsistency may trigger the search for the presence of additional inconsistencies with the general surface area of the detected inconsistency. The search may involve trimming away an overlapping edge of a first skin panel from an associated second skin panel to expose additional surface area in the vicinity of the detected inconsistency (operation 2104). In operation 2104, the trimming may be performed on a portion of a first skin panel overlapping a second panel to expose a previously overlapped region of the second panel, while leaving the second panel unchanged. Trimming in operation 2104 may be performed without undesirably changing the overlap joint and without removing a remaining portion of the first skin panel. The remaining portion of the first skin panel may not be completely removed. At least some of the first skin panel will remain after trimming.

The exposed surface areas may be inspected to determine whether the detected inconsistencies are blendable inconsistencies (operation 2106).

The presence of blendable inconsistencies may result in some or all inconsistencies being reworked (operation 2112). The surface areas may also be inspected for the presence of unblendable inconsistencies. A high frequency eddy current inspection is conducted (operation 2108). The high frequency eddy current inspection may not detect any areas of unblendable inconsistencies. However, additional areas of blendable inconsistencies may be detected through the high frequency eddy current inspection and reworked (operation 2112) with the process terminating thereafter. A rework technique may include, for example, without limitation, the blending out of the inconsistency. Inconsistencies may also be reworked by adding a doubler through replacement or other such corrective actions.

If unblendable inconsistencies are detected (operation 2110), the area or section containing the unblendable inconsistency may be replaced (operation 2114), a patch may be added (operation 2116), or a doubler may be added (operation 2118). For example, replacement of an unblendable area may be performed through excision of the unblendable portion and the installation of a replacement panel such as the repair doubler (operation 2118).

Figure 22:
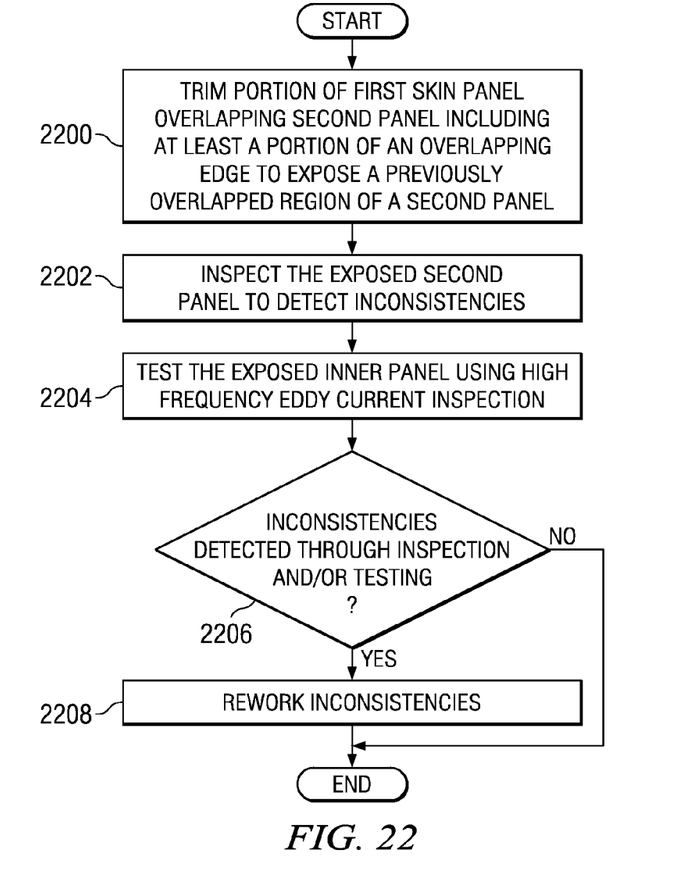
FIG. 22 is an illustration of a flowchart for a process for managing metal inconsistencies in accordance with an advantageous embodiment.

With reference now to FIG. 22, an illustration of a flowchart for a process for managing metal inconsistencies is depicted in accordance with an advantageous embodiment. The process illustrated in FIG. 22 may be implemented in an inspection environment such as, for example, without limitation, inspection environment 500 in FIG. 5. Further, the process may be implemented for an overlap joint in the fuselage of an aircraft such as, for example without limitation, overlap joint 506 in fuselage 504 of aircraft 502 in FIG. 5.

Referring now to the process of FIG. 22 as implemented in accordance with the advantageous embodiment of FIG. 5, the process may begin by trimming portion 507 of first skin panel 508 overlapping second panel 510 including at least a portion of overlapping edge 512 to expose previously overlapped region 516 of second panel 510 (operation 2200). The trimming may be performed without undesirably changing overlap joint 506 and without removing remaining portion 544 of first skin panel 508. At least some of remaining portion 544 may remain after trimming. Further, second panel 510 may be unchanged from the trimming. The trimming may comprise using a rotary trimming tool to cut trimmed portion 540 of first skin panel 508 proximate to a detected inconsistency. In these illustrative examples, previously overlapped region 516 may be exposed second panel 542 after the trimming in operation 2200.

The process may additionally inspect exposed second panel 542 to detect inconsistencies 518 (operation 2202). This inspection may be performed using visual inspection 530. Inconsistencies 518 in metal may be selected from blendable inconsistencies 520, unblendable inconsistencies 524, corrosion 522, and/or some other type of metal inconsistency. The process may test exposed second panel 542 using high frequency eddy current inspection 532 (operation 2204). High frequency eddy current inspection 532 may be performed to detect inconsistencies 518 such as, for example, without limitation, unblendable inconsistencies 524.

The process may determine whether inconsistencies 518 were detected in operation 2202 and/or operation 2204 (operation 2206). If inconsistencies 518 are not detected, the process may terminate. In response to the detection of inconsistencies 518, the process may rework inconsistencies 518 through rework 534 (operation 2208), with the process terminating thereafter.

Rework 534 may include blending out 552 and/or section removal and replacement 554. For example, without limitation, blending out 552 may be performed for detected blendable inconsistencies 546 detected in operation 2202. Further, section removal and replacement 554 may be performed for inconsistencies 518 including, without limitation, detected unblendable inconsistencies 548 detected in operation 2204. Section removal and replacement 554 may include removing section 550 of exposed second panel 542 with detected unblendable inconsistencies 548 and replacing section 550 with replacement panel 556. In these examples, replacement panel 556 may be replacement doubler 558.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

It should be appreciated that, although the inventive technique has been primarily described above in conjunction with overlap joints, the technique may be applied to rework metal and composite inconsistencies, such as unblendable inconsistencies and blendable inconsistencies proximate circumferential overlap joints or other joints. For example, one skilled in the art may recognize that circumferential joints comprise two overlapping edges such as overlapping edges 718 and 720 of FIG. 7. Therefore, many or all of the steps of the inventive technique may need to be performed twice, once for each overlapping edge, to inspect and possibly rework the entire circumferential joint.

The description of the different advantageous embodiments has been presented for purposes of illustration and description, and is not intended to be exhaustive or limited to the embodiments in the form disclosed. Many reworks and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various reworks as are suited to the particular use contemplated.

What is claimed is:

1. A method of detecting inconsistencies proximate a panel splice joint, the method comprising steps of:
    trimming a portion of a first panel overlapping a second panel to expose a previously overlapped region of the second panel, wherein the trimming is performed without undesirably changing a panel splice joint; and
    inspecting the previously overlapped region to detect any inconsistencies after trimming the portion.

2. The method of claim 1, wherein the trimming leaves the second panel substantially unchanged.

3. The method of claim 1, wherein at least a portion of the first panel remains after the trimming.

4. The method of claim 1, wherein the step of inspecting comprises a visual inspection.

5. The method of claim 1, further comprising a step of:
    inspecting the previously overlapped region to detect a number of inconsistencies.

6. The method of claim 5, wherein the step of inspecting comprises:
    performing a high frequency eddy current inspection.

7. The method of claim 1, further comprising a step of:
    reworking the number of inconsistencies detected in the inspecting.

8. The method of claim 7, wherein the step of reworking comprises:
    removing a section of the previously overlapped region; and
    replacing the removed section with a replacement panel.

9. The method of claim 1, wherein the detected inconsistencies being a number of blendable inconsistencies in metal, the step of reworking comprises:
    blending out the number of blendable inconsistencies.

10. The method of claim 1, wherein the step of trimming comprises:
    cutting with a rotary trimming tool.

11. The method of claim 10, wherein the step of trimming further comprises:
    responsive to cutting with the rotary trimming tool, manually scraping away a residual portion of the first panel.

12. A method of detecting inconsistencies, the method comprising steps of:
    trimming a portion of a first skin panel overlapping a second panel to expose a previously overlapped region of the second panel, wherein the trimming is performed without undesirably changing an overlap joint and without removing a remaining portion of the first skin panel;
    inspecting the previously overlapped region to detect any inconsistencies after trimming the portion, the step of inspecting comprising a visual inspection;
    inspecting the previously overlapped region to detect a number of inconsistencies; and
    reworking the detected inconsistencies.

13. The method of claim 12, wherein the trimming leaves the second panel substantially unchanged.

14. The method of claim 12, wherein the trimming comprises:
    cutting with a rotary trimming tool; and
    responsive to cutting with the rotary trimming tool, manually scraping away a residual portion of the first skin panel.

15. The method of claim 12, wherein the step of inspecting comprises performing a high frequency eddy current inspection.

16. The method of claim 12, wherein the step of reworking comprises:
   removing a section of the previously overlapped region; and
   replacing the removed section with a replacement panel.

17. The method of claim 12, wherein the inspecting detects a number of blendable inconsistencies; and wherein responsive to the inspecting, the reworking blends out the number of blendable inconsistencies.

18. A method of detecting inconsistencies, the method comprising steps of:
   trimming a portion of the first skin panel overlapping the second panel to expose a previously overlapped region of the second panel while leaving the second panel unchanged, wherein trimming is performed without undesirably changing the overlap joint and without removing a remaining portion of the first skin panel, and wherein at least some of the remaining portion remains after trimming; and
   inspecting, after the step of trimming, the previously overlapped region to detect inconsistencies.

19. The method of claim 18, further comprising a step of: reworking the detected inconsistencies.

20. The method of claim 18, wherein responsive to the inconsistencies being a number of blendable inconsistencies, the step of reworking comprises:
   blending out the number of blendable inconsistencies that are detected.

21. The method of claim 18, wherein the step of inspecting comprises:
   visually inspecting for inconsistencies.

22. The method of claim 18, wherein the step of inspecting comprises:
   performing a high frequency eddy current inspection.

23. The method of claim 18, wherein the step of trimming comprises:
   cutting with a rotary trimming tool.

24. The method of claim 18, further comprising:
   responsive to the step of inspecting, detecting a number of inconsistencies.

25. A method of detecting inconsistencies, the method comprising steps of:
   trimming a portion of the first skin panel overlapping the second panel to expose a previously overlapped region of the second panel while leaving the second panel unchanged, wherein trimming is performed without undesirably changing the overlap joint and without removing a remaining portion of the first skin panel, and wherein at least some of the remaining portion remains after trimming,
      wherein the step of trimming comprises cutting with a rotary trimming tool;
   inspecting, after the step of trimming, the previously overlapped region to detect inconsistencies, wherein
   the step of inspecting comprises visually inspecting for inconsistencies, the inconsistencies being selected from at least one of a number of blendable inconsistencies, corrosion, and a number of unblendable inconsistencies;
   inspecting the previously overlapped region to detect inconsistencies, the step of inspecting comprising performing a high frequency eddy current inspection;
   responsive to at least one of the step of inspecting and the step of inspecting, detecting a number of inconsistencies; and
   reworking the detected inconsistencies, wherein
      responsive to the inconsistencies being a number of blendable inconsistencies, the step of reworking comprises blending out the number of blendable inconsistencies that are detected.

26. A method of managing inconsistencies, the method comprising steps of:
   trimming a portion of the first skin panel overlapping the second panel including at least a portion of the overlapping edge to expose a previously overlapped region of the second panel, wherein trimming is performed without undesirably changing the overlap joint and without removing a remaining portion of the first skin panel, and wherein at least some of the remaining portion remains after trimming, while leaving the second panel unchanged;
   inspecting the previously overlapped region to detect a number of inconsistencies selected from the group consisting of a number of blendable inconsistencies, a number of unblendable inconsistencies, and corrosion; and
   inspecting the previously overlapped region to detect a number of inconsistencies.

27. The method of claim 26, further comprising the step of:
   responsive to the inspecting, detecting a number of inconsistencies; and
   reworking a number of the detected inconsistencies.

28. The method of claim 27, wherein the trimmed portion of the first skin panel is proximate to a detected inconsistency.

29. The method of claim 26, wherein the step of inspecting comprises:
   performing a high frequency eddy current inspection that detects unblendable inconsistencies.

30. The method of claim 26, wherein the step of inspecting comprises:
   a visual inspection.

31. The method of claim 26, wherein the step of reworking comprises:
   blending out detected blendable inconsistencies.

32. The method of claim 26, wherein the step of trimming comprises:
   cutting with a rotary trimming tool.

33. The method of claim 26, wherein the step of reworking comprises:
   removing a section of the previously overlapped region including a detected number of inconsistencies; and
   replacing the removed section with a replacement panel.

34. The method of claim 33, wherein the replacement panel is a replacement doubler.

35. A method of managing inconsistencies, the method comprising steps of:
   trimming a portion of the first skin panel overlapping the second panel including at least a portion of the overlapping edge to expose a previously overlapped region of the second panel, wherein trimming is performed without undesirably changing the overlap joint and without removing a remaining portion of the first skin panel, and wherein at least some of the remaining portion remains after trimming, while leaving the second panel unchanged, wherein the trimming comprises cutting with a rotary trimming tool, the trimmed portion of the first skin panel being proximate to a detected inconsistency;
   inspecting the previously overlapped region to detect a number of inconsistencies selected from the group consisting of a number of blendable inconsistencies, a number of unblendable inconsistencies, and corrosion;

inspecting the previously overlapped region to detect a number of inconsistencies, the inspecting comprising performing a high frequency eddy current inspection that detect unblendable inconsistencies;
responsive to the inspecting and the inspecting, detecting a number of inconsistencies; and
reworking a number of the detected inconsistencies, the reworking comprising:
blending out detected inconsistencies;
removing a section of the previously overlapped region including a detected number of inconsistencies; and
replacing the removed section with a replacement panel, wherein the replacement panel is a replacement doubler.

* * * * *